United States Patent
Kim et al.

(10) Patent No.: US 7,979,696 B2
(45) Date of Patent: Jul. 12, 2011

(54) SYSTEM AND METHOD OF PROVIDING SECURITY

(75) Inventors: Ji-soo Kim, Yongin-si (KR); Bo-gyeong Kang, Seoul (KR); Hyun-jin Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 830 days.

(21) Appl. No.: 11/832,168

(22) Filed: Aug. 1, 2007

(65) Prior Publication Data

US 2008/0141027 A1      Jun. 12, 2008

(30) Foreign Application Priority Data

Dec. 6, 2006  (KR) .................... 10-2006-0123366

(51) Int. Cl.
*H04L 29/06*   (2006.01)
(52) U.S. Cl. ...................................... 713/156
(58) Field of Classification Search .................. None
See application file for complete search history.

(56) References Cited

U.S. PATENT DOCUMENTS

| | | | | |
|---|---|---|---|---|
| 2005/0223415 | A1* | 10/2005 | Oho et al. | 726/27 |
| 2008/0059799 | A1* | 3/2008 | Scarlata | 713/176 |

FOREIGN PATENT DOCUMENTS

| | | |
|---|---|---|
| JP | 2005-5778 | 1/2005 |
| KR | 96-39739 | 11/1996 |
| KR | 2004-99429 | 11/2004 |
| KR | 2004-318391 | 11/2004 |
| KR | 2006-49447 | 5/2006 |

OTHER PUBLICATIONS

Korean Abstract Publication No. 100143598 B1.

* cited by examiner

*Primary Examiner* — Brandon S Hoffman
(74) *Attorney, Agent, or Firm* — Jefferson IP Law, LLP (57) ABSTRACT

A method and system for providing security between a service providing server and a user device, the system including: a user device to request a service and to transmit a packet including a first public key; an authentication server to receive the packet, to authenticate the user device based on the first public key, to generate a secret key if the user device is authenticated, and to transmit the secret key to the user device; and a service providing server to check an integrity of the user device by using information for an integrity attestation having the secret key, and to provide the service to the user device according to the integrity of the user device. When the remote integrity attestation of the user device is implemented by the service providing server, the anonymity of the user device is guaranteed and the integrity of the user device is authenticated.

20 Claims, 5 Drawing Sheets

SYSTEM AND METHOD OF PROVIDING SECURITY

CROSS-REFERENCE TO RELATED APPLICATION

This application claims all benefits accruing under 35 U.S.C. §119 from Korean Application No. 2006-123366, filed on Dec. 6, 2006 in the Korean Intellectual Property Office, the disclosure of which is incorporated herein by reference.

BACKGROUND OF THE INVENTION

1. Field of the Invention

Aspects of the present invention relate to a system and method for providing security, and more particularly, to a system and method for issuing a secret key according to the validity of a security module of a user device in an authentication server, and anonymously implementing the integrity attestation of a user device and a service providing server through a security protocol in order to use a security protocol for implementing the integrity attestation.

2. Description of the Related Art

With the development of communication technology and computers, multiple problems related to computer security have arisen. A variety of methods have been suggested to solve these problems, and among them, a method of guaranteeing the integrity of the corresponding system is widely used. Integrity attestation is a process of checking the authority of a device or person for data or network security. In contrast to the integrity attestation, alternative security methods are used to strictly control data access or a physical environment of a network terminal and/or a server.

The integrity attestation is implemented for authentication between a user device and a server that provides a predetermined service. The authentication of the corresponding device is implemented by confirming a measurement with respect to a composition or a setting of software and hardware on a specific platform or on a system, through the other certificate authority, and attesting the integrity of the corresponding devices.

Figure 1:
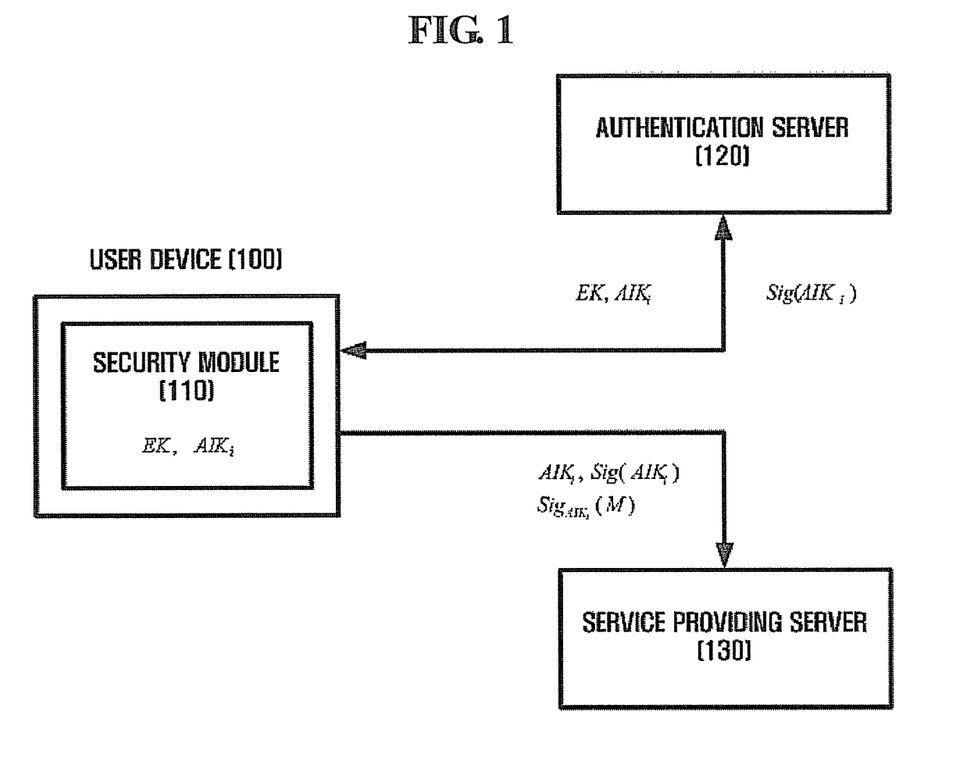
FIG. 1 illustrates an integrity attestation system using v1.1 of a trusted platform module (TPM) of a trusted computing group (TCG)

FIG. 1 illustrates an integrity attestation system using v1.1 of a trusted platform module (TPM) of a trusted computing group (TCG). Referring to FIG. 1, the integrity attestation system includes a user device 100, an authentication server 120, and a service providing server 130. The user device 100 includes a security module 110 so that general online services can be safely used. An integrity attestation of the user device 100 is implemented by the service providing server 130.

The security module 110 of the user device 100 serves as a security hardware device on a system platform, storing a key generated for encryption of data. A solution based on hardware helps prevent attacks, and the security module 110 prevents the system platform from being modified by a user (not illustrated) or a software application.

The TPM is one example of the security module 110 capable of providing computing to run cryptographic protocols and capable of safely storing significant information (such as a secret key for encryption). The TPM includes an endorsement key (EK) and an attestation identity key (AIK). The EK includes a secret/public key pair as a key value that is stored in the security module 110 in advance. These values are originally stored in the security module 110. Once stored, the secret key included in the EK is issued by a trusted third party ($3^{rd}$) and cannot be known by any entity outside of the security module 110. The EK is verified in the illustrated authentication server 120 or in an authentication server of FIG. 2 using the key values based on a validity verification with respect to the security module 110.

The AIK is a secret/public key pair that is created in the security module 110. An AIK secret key is not exposed to the outside of the security module 110.

The service providing server 130 remotely implements the integrity attestation in the user device 100. The service providing server 130 provides a predetermined service that a user requests within the verified user device 100 by attesting the integrity of the authenticated user device 100.

The integrity-attestation system, including the components shown in FIG. 1, transmits an optional $AIK_i$ among the AIKs created in the security module 110 of the user device 100, along with the EK to the authentication server 120 so as to receive a predetermined service of the service providing server 130 in the user device 100. The authentication server 120 determines the validity of the security module 110 in the user device 100 based on receipt of the EK.

When the security module 110 is determined to be valid, the authentication server 120 digitally signs the $AIK_i$(Sig($AIK_i$)) received with the EK by using the secret key of the authentication server 120.

When the digital signature is completed, the corresponding signature is transmitted to the user device 100 and stored in the security module 110. The user device 100 that receives the digital signature requests a predetermined service from the service providing server 130, and the service providing server 130 requests the integrity attestation of the user device 100.

The integrity attestation of the user device 100 is achieved by comparing a measurement metric (M) (for example, the hash value) with respect to hardware and software information (version information, serial number, manufacturer, and binary code) of the user device 100 (target of the integrity attestation).

After the digital signature ($Sig_{AIK_i}(M)$) is performed by using the AIK secret key on the measurement metric (M) calculated in the security module 110, the integrity attestation of the user device 100 and the service providing server 130 transmits the public key of $AIK_i$ and the digital signature ($Sig(AIK_i)$) received from the authentication server 120 to the service providing server 130.

The service providing server 130 determines if the digital signature ($Sig(AIK_i)$) performed by the authentication server 120 is valid through the received information, and implements the integrity attestation by comparing the measurement metrics (M).

Since the $AIK_i$ transmitted from the security module 110 to the authentication server 120 and the $AIK_i$ transmitted to the service providing server 130 are identical in the conventional art, there is a problem of private information outflow (when and what kinds of services are received through the user device 100) in a plurality of business models included in a service provider with an identical authentication server 120 and service providing server 130.

That is, in the conventional TPM v1.1, the integrity attestation is implemented with respect to the user device 100 and the service providing server 130 within the scope where the anonymity can be guaranteed. The user device 100 that receives specific services can be easily distinguished through the EK included in the security module 110 of the user device 100 and the AIK corresponding to the EK.

Figure 2:
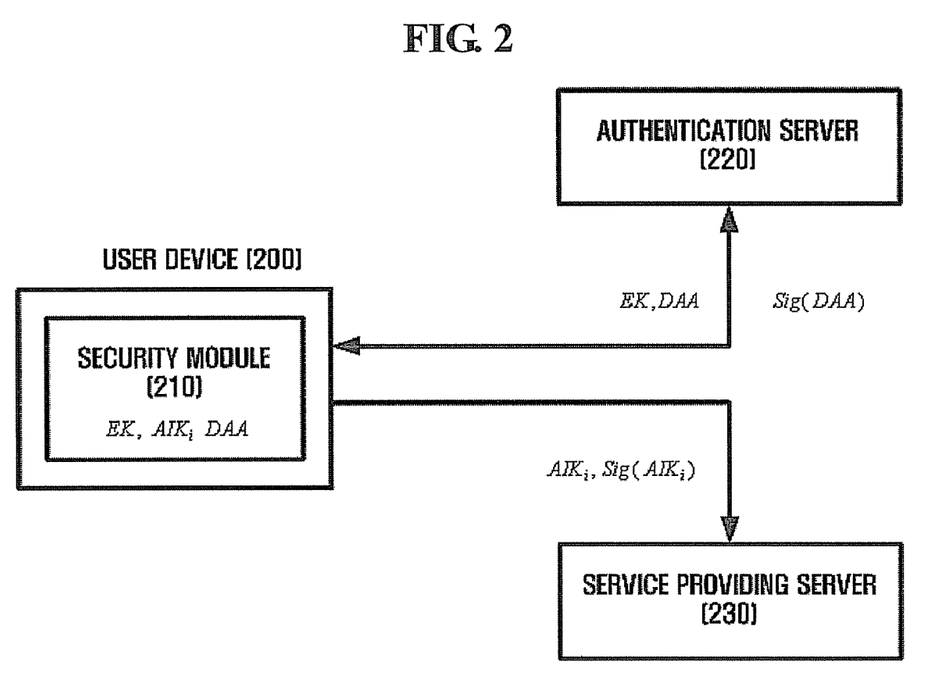
FIG. 2 illustrates an integrity attestation system operated through an anonymous authentication using TPM v1.2 of TCG.

FIG. 2 illustrates an integrity attestation system operated through an anonymous authentication using TPM v1.2 of TCG. Referring to FIG. 2, the integrity attestation device includes a user device 200, an authentication server 220, and a service providing server 230. The user device includes a security module 210 that has the EK, the AIK, and a direct anonymous attestation (DAA).

The authentication server 220, as a trusted third party, determines the validity of the corresponding security module 210 through the validity verification of the EK stored in the TPM, and provides the digital signature ($Sig_{DI}(DAA)$) by using a secret key of the authentication server 220 on the DAA public key transmitted along with the result of the validity determination.

After the validity of the security module 210 is determined through the authentication server 220 and a specific service is requested from the service providing server 230 by the user device 200, the service providing server 230 requests the integrity attestation with respect to the security module 210.

When the integrity attestation is requested, the security module 210 creates the $ALK_i$ and the measurement metric (M) signed using the $AIK_i$ is transmitted to the service providing server 230. The service providing server 230 that receives predetermined sets of information implements the integrity attestation by determining if the M is the DAA public key included in the valid security module 210 signed by the authentication server 220 or if the M is the AIK signed by the corresponding key. The integrity attestation is described in "Direct Anonymous Attestation" written by E. Brickell, J. Camenisch, and L. Chen.

Since the information (EK and DAA) provided to the authentication server 220 and that provided to the service providing server 230 are different in the conventional art, the anonymity is guaranteed. However, the separate authentication of the service providing server 230 is not made, and, as a result, the possibility of hacking or phishing attacks is high.

Further, a protocol for the authentication of the service providing server 230 should be performed separately on the user device 200 and on the service providing server 230, and therefore, there is a problem that session-key sharing and channel protection are additionally required.

SUMMARY OF THE INVENTION

Aspects of the present invention provide a system and method for issuing a secret key according to the validity of a security module of a user device in an authentication server, and anonymously implementing the integrity attestation of a user device and a service providing server through a security protocol in order to use a security protocol for implementing the integrity attestation.

Additional aspects and/or advantages of the invention will be set forth in part in the description which follows and, in part, will be obvious from the description, or may be learned by practice of the invention.

In accordance with an example embodiment of the present invention, there is provided a system for providing security between a service providing server and a user device having a software and/or hardware component to implement a service provided by the service providing server. Such a system includes: a user device to request a service and to transmit a packet having a first public key; an authentication server to receive the packet from the user device, to authenticate the user device by using the first public key, to generate a secret key if the user device is authenticated, and to transmit the secret key to the user device; and a service providing server to check an integrity of the user device by using information for an integrity attestation having the secret key, which is transmitted by the user device, and, according to the result, to provide the service to the user device.

In accordance with an example embodiment of the present invention, there is provided a method of providing security between a service providing server and a user device having a software and/or a hardware component to implement a service provided by the service providing server. Such a method includes: requesting a service for the user device from the service providing server; transmitting a packet having an ID of a server that provides a predetermined service, and a first public key from the user device to an authentication server; authenticating the user device by using the first public key, generating a secret key if the user device is authenticated, and transmitting the secret key to the user device; transmitting the secret key from the user device to the service providing server; checking an integrity of the user device in the service providing server by using information for an integrity attestation having the secret key received from the user device; and providing the service from the service providing server to the user device.

In accordance with another example embodiment of the present invention, there is provided a user device to request a service in a system for providing security having a service providing server to provide the service and an authentication server to authenticate the user device. Such a user device comprises: a security module to transmit a packet including a first public key to the authentication server in order to authenticate the user device based on the first public key, to receive a secret key from the authentication server if the user device is authenticated, and to transmit information, for an integrity attestation, having the secret key to the service providing server; and an authenticated target to request a service from the service providing server, and to use the service if the authenticated target is verified by the service providing server for the integrity attestation.

In accordance with yet another example embodiment of the present invention, there is provided a service providing server to provide a service to an authenticated user device that receives a secret key in a system for providing security. Such a service providing server is configured to check an integrity of the user device by using information for an integrity attestation having the secret key, which is received from the user device; and to provide the service to the user device according to the integrity of the user device.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
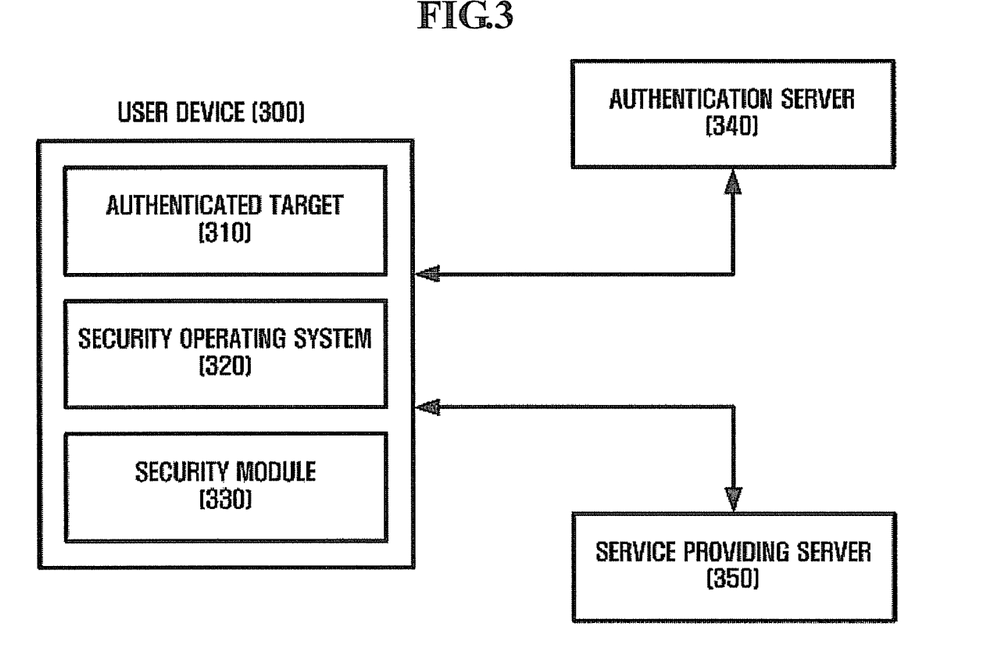
FIG. 3 illustrates a system for providing security according to an example embodiment of the present invention.

FIG. 3 illustrates a system for providing security according to an example embodiment of the present invention. Referring to FIG. 3, the system for providing security includes a user device 300 having an authenticated target 310, a security operating system 320, and a security module 330; an authentication server 340; and a service providing server 350. Based on an authenticated anonymous attestation (AAA) protocol (hereinafter, referred to as "protocol"), the system for providing security issues a secret key from an authentication server 340 and runs a security protocol to implement an integrity attestation between a user device 300 and a service providing server 350 so that the anonymity of the user device 300 can be guaranteed. Not shown in FIG. 3 is a wired and/or wireless communication network used to connect the user device 300 to the authentication server 340 and the service providing server 350.

First, the user device 300 contacts the service providing server 350 online through a communication network (not shown), such as the Internet, and requests a predetermined service desired by the user. The user device 300 may be of a personal computer (PC), a personal digital assistance (PDA), an ultra-mobile personal computer (UMPC), or a mobile phone. As mentioned above, the user device 300 can use online services through a predetermined communication network.

The user device 300 includes the authenticated target 310, the security operating system 320, and the security module 330. These components of the user device 300 can be provided separately or as a single module (as illustrated in FIG. 3).

The authenticated target 310 of the user device 300 is a software or hardware component implemented to use a predetermined service in the user device 300. The authenticated target 310 is verified by the service providing server 350 for the integrity attestation.

The security operating system 320 is implemented through a security booting of the security module 330, and enables the upper application to use a service of the security module 330. A calculation to create an integrity measurement metric stored in the security module 330 is implemented in this running system.

The security module 330 prevents the authenticated target 310 from being modified or changed by a user or a software application. The security module 330 stores information on the calculation and information on security for implementing a security protocol according to aspects of the present invention.

The information stored in the security module 330 includes a secret key ($\beta_i$) issued by the authentication server 340, a certificate ($Sig_{CA}(PubKey_V)$) signed by a secret key corresponding to a second public key of the service providing server 350 signed by a predetermined certificate authority (not illustrated), and an electronic signature ($Sig_V(g^b, c, d)$) of the service providing server 350 that is a response message to an encryption message transmitted from the security module 330. These sets of information are stored inside or outside of the security module 330.

The security module 330 may include an endorsement key (EK) or an attestation identity key (AIK). The EK may include a private/public key pair stored in the security module 330 in advance when the public key is issued by a trusted third party, and the user device 300 is manufactured.

The private key of the EK may, although not necessarily, not to be exposed outside of the security module 330 once stored therein. The first public key (the public key of the EK) determines the validity of the security module 330, which suggests the value of the corresponding key. The validity determination with respect to the security module 330 is performed by a certificate authority (not illustrated) or the illustrated authentication server 340.

The security module 330 transmits an identification ($ID_V$) of the service providing server 350 to the authentication server 340 when the first public key is transmitted, creates optional constants a, d, r, and s, and transmits, to the service providing server 350, a message ($Enc(PuKey_V, (u, v, g^a, d))$) encrypted to implement the security protocol.

The message ($Enc(PuKey_V, (u, v, g^a, d))$) encrypted in the security module 330 is based on a private key corresponding to a third ($3^{rd}$) public key of the service providing server 350, and u and v (first and second messages) created by the security module 330 and authenticating the service providing server 350. The messages are calculated by the security module 330 based on the condition $u=r^{r^2}$, $v=s^{r^2}$, and satisfies the fact that the optional constants a, d, r and s are elements of $Z^*_N$.

After the messages ($Enc(PuKey_V, (u, v, g^a, d))$) encrypted in the security module 330 are transmitted, the service providing server 350 transmits an electronic signature ($Sig_V(g^b, c, d)$) signed by the secret key of the corresponding server to the security module 330 in response to the transmission.

The security module 330 that receives the electronic signature ($Sig_V(g^b, c, d)$) from the service providing server 350 implements the authentication with respect to the service providing server 350 by comparing the d included in the transmitted encrypted message ($Enc(PuKey_V, (u, v, g^a, d))$) and the d included in the received electronic signature ($Sig_V(g^b, c, d)$) of the service providing server 350. Here, the electronic constants r and s based on the generation of the values u and v included in the encrypted message are referred to as first and second authentication constants respectively. Furthermore, the d compared in the encrypted message ($Enc(PuKey_V, (u, v, g^a, d))$) of the security module 330 and the electronic signature ($Sig_V(g^b, c, d)$) of the service providing server 350 is referred to as a third constant. The authentication for the service providing server 350 is implemented based on these constants.

Depending on the result of the authentication implementation with respect to the service providing server 350, the service providing server 350 and the security module 330 create a session key by using $g^{ab}$ (mod N) and the ID of the service providing server 350.

After the session key is created, the security module 330 transmits a first zero-knowledge parameter, a second zero-knowledge parameter, a measurement metric (M), and a hash value ($H$ ($Ksession$, (u, v, y, z, M))) to the service providing server 350 in order to demonstrate that it is a valid device capable of receiving services. Here, y of the first zero-knowledge parameter is $\beta_i r^l$, z of the second zero-knowledge parameter is $r^c$ s, l is the constant set by the authentication server 340, $K_{Session}$ is a session key between the security module 330 and the service providing server 350, u and v created by the security module 330 respectively indicate the first and second messages for authenticating the service providing server 350, and M indicates the measurement metric calculated by the security module 330.

The authentication server 340 determines the validity of the security module 330 based on the EK stored in the security module 330, creates a secret key $\beta_i$ in order to run a security protocol for the integrity attestation of the user device 300, and transmits the secret key $\beta_i$ to the user device 300. To achieve this, the authentication server 340 creates a predetermined parameter needed for the security protocol. The parameters created in the authentication server 340 are generated as a secret key containing p, q, t, $\mu$ and a public key containing N, T ($=t^l$ mod N), l, g, f functions. At this time, g and f, from among the created public key parameters, are used to encrypt messages and create a session key when the security protocol is run. The authentication server 340 determines the validity of the corresponding module (the security module 330) based on the first public key transmitted from the security module 330.

According to the result of the determination, the secret key $\beta_i$ created using the parameters is generated. The secret key $\beta_i$ satisfies $t \cdot \mu^i$ (mod N), and $\mu$, as the lth root of 1 satisfying $\mu \in Z_n$, satisfies $\mu \neq 1$ mod p, $\mu \neq 1$ mod p. Here, l is the smallest prime number among the integers greater than the m, and m is greater than the number of the targets (generally, the number of members) for the integrity attestation of the service providing server 350.

Such a secret key is created in the authentication server 340 and issued to the security module 330. The certificate $\text{Sig}_{CA}$(PubKey$_V$) signed by the secret key corresponding to the second public key of the service providing server 350 signed by a predetermined certificate authority (not illustrated) is transmitted together with the secret key $\beta_i$ to the security module 330. As stated above, the security module 330 stores the certificate $\text{Sig}_{CA}$(PubKey$_V$)).

The service providing server 350 provides a predetermined service according to the user request online, and implements the integrity attestation with respect to the authenticated target 310 of the user device 300 for receiving services.

After the secret key of the authentication server 340 is issued, the service providing server 350 receives a message Enc(PuKey$_V$, (u, v, g$^a$, d))encrypted based on predetermined constants a, d, r, s that are created in the security module 330.

The service providing server 350 that receives the encrypted message creates predetermined numbers b and c, and transmits the electronic signature $\text{Sig}_V$(g$^b$, c, d) signed by the secret key of the service providing server 350 to the security module 330. After the electronic signature of the service providing server 350 is transmitted, the authentication of the service providing server 350 is performed in the security module 330 by comparing the third authentication constant (i.e., a value of d) included in the encrypted message Enc(PuKey$_V$, (u, v, g$^a$, d)) of the security module 330 and the electronic signature $\text{Sig}_V$(g$^b$, c, d) received from the service providing server 350.

The session key, created after the authentication of the service providing server 350 is performed, is described above with reference to the security module 330, and, therefore, a detailed description of the session key is omitted here.

Also, the service providing server 350, to which the authentication is completed, receives a message containing zero-knowledge parameters y=$\beta_i$r$^l$ and z=r$^c$s, the measurement metric M, and a hash value H(K$_{session}$, (u, v, y, z, M)). The service providing server 350 performs the authentication of the security module 330 based on y$^l$=Tu, z$^l$=u$^c$v, described in "Anonymous Authentication With Subset Queries" written by Dan Boneh and Matt Franklin. The session key for the hash function can be utilized as a seed value for creating a secret key or the corresponding secret key in order to protect the channels after the integrity attestation is performed.

Figure 4:
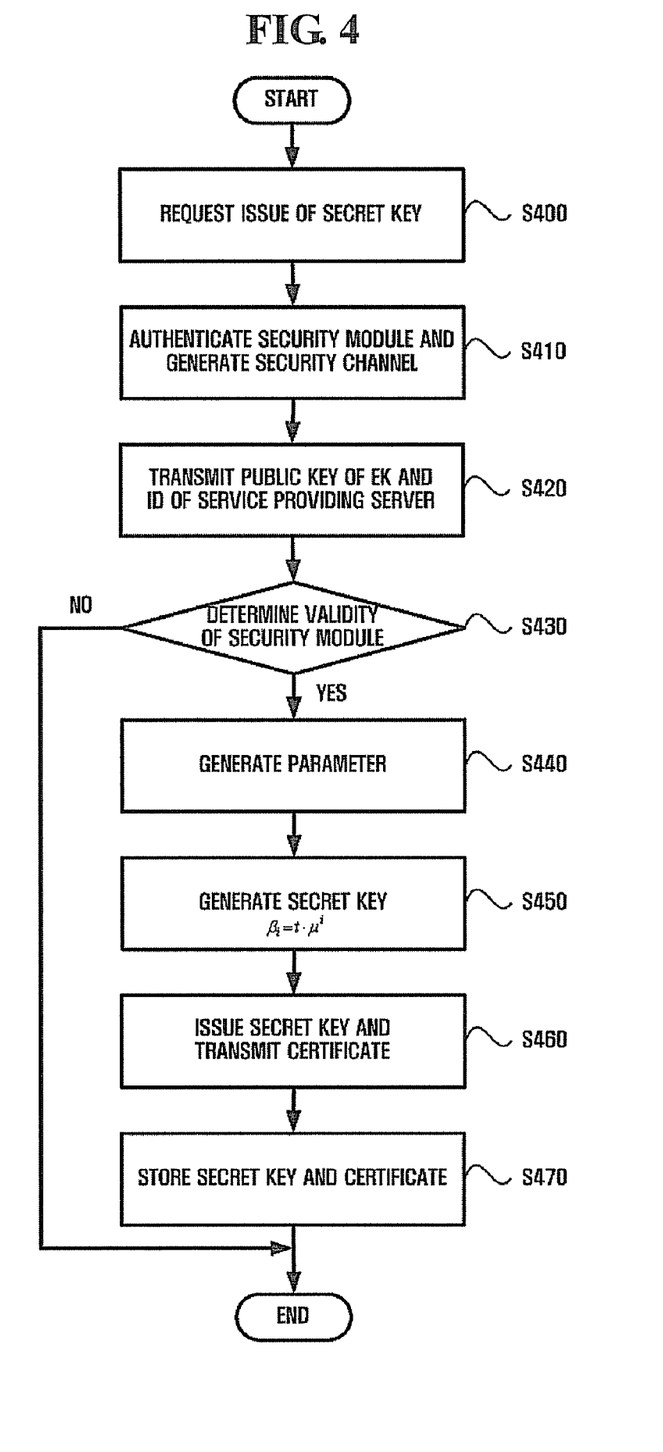
FIG. 4 illustrates a method of issuing a secret key according to an example embodiment of the present invention.

FIG. 4 illustrates a method of issuing a secret key according to an example embodiment of the present invention. Referring to FIGS. 3 and 4, the secret key is issued by the authentication server 340 based on the first public key transmitted from the security module 330 of the user device 300 and a predetermined parameter created in the authentication server 340. The secret key is used for the security protocol that enables the integrity attestation to be implemented.

In operation S400, the user device 300 requests a secret key from the authentication server 340. When the issue for the secret key is requested (operation S400), the security module 330 is authenticated and a security channel between the security module 330 of the user device 300 and the authentication server 340 is created in operation S410. At this time, general security protocols (such as secure sockets layer (SSL) and transport layer security (TLS)) may be used as the created security channels.

When the security channels are created (operation S410), the security module 330 transmits, in operation S420, the pre-stored first public key to the authentication server 340 and ID$_V$, which is an ID of the service providing server 350 that provides an online service.

The authentication server 340 that receives ID$_V$ of the service providing server 350 from the security module 330 (operation S420) determines the validity of the security module 330 based on the first public key in operation S430.

If the security module 330 is determined to be valid (operation S430), the authentication server 340 creates one or more predetermined parameters required by the security protocol in operation S440. The one or more parameters created by the authentication server 340 (operation S440) are related to a public key including p, q, t, $\mu$ and a public key including N, T ($=t^l$ mod N), l, wherein N is p and q and satisfies l|p−1, l|q−1 but l$^2$ ∤p−1, l$^2$ ∤l−1, and T indicates t$^l$ (mod N), t$\in Z_N$.

In operation S450, the authentication server 340 creates a secret key based on the one or more parameters needed for a security protocol.

In operation S460, the secret key $\beta_i$ created by the authentication server 340 (operation S450) is transmitted to the security module 330 satisfying $t \cdot \mu^i$ (mod N) and 0<i<m, along with a certificate $\text{Sig}_{CA}$(PubKey$_V$) signed by a secret key corresponding to a second public key of the service providing server 350 signed by a certificate authority during the transmission of the secret key.

The transmitted secret key $\beta_i$ and certificate $\text{Sig}_{CA}$(PubKey$_V$) are stored in the security module 330 in operation S470.

For the anonymous authentication, the security module 330 determines the validity with respect to the first public key by determining only the first public key and the ID$_V$ provided from the service providing server 350, and issues the secret key $\beta_i$ that can use a protocol for the integrity attestation according to the determination of the validity and the certificate $\text{Sig}_{CA}$(PubKey$_V$) of the service providing server 350 having the ID$_V$ as an eigenvalue.

Figure 5:
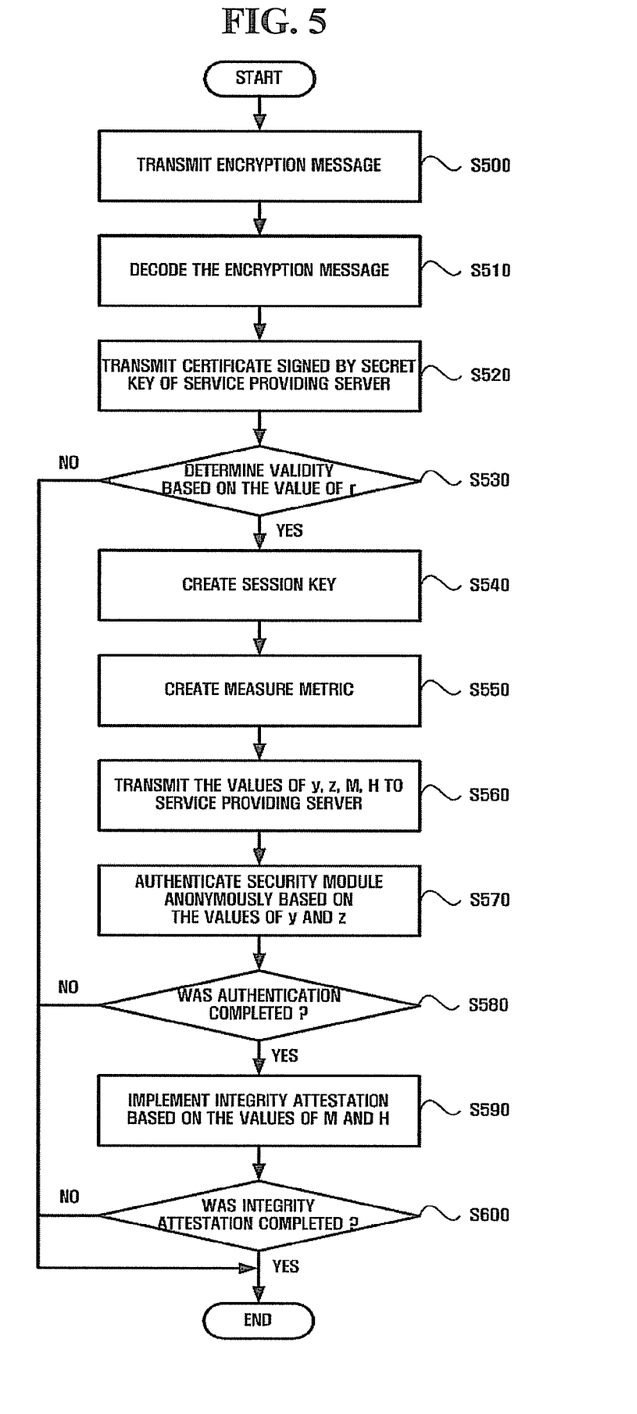
FIG. 5 illustrates an integrity attestation process according to an example embodiment of the present invention.

FIG. 5 illustrates an integrity attestation according to an example embodiment of the present invention. The integrity attestation process according to aspects of the present invention is executed for a predetermined application (software) and/or a predetermined system platform (hardware) of the authenticated target 310 that will receive the online service based on the secret key created in FIG. 4.

Referring to FIGS. 3, 4, and 5, in operation S500, the security module 330 transmits a message $Enc(PuKey_V, (u, v, g^a, d))$ encrypted by a secret key corresponding to a third public key of the service providing server 350 to the service providing server 350, based on the predetermined constants a, d, r, s created in the corresponding module for the integrity attestation with respect to the authenticated target 310 of the user device 300 that will receive online service and a predetermined N, T, l, g, f created in the service providing server 350. Here, the constants created in the security module 330 are described above with reference to FIG. 3 and, therefore, a detailed description is omitted here. The u and v are created by the security module 330, and include the first and second messages for the attestation of the service providing server 350. As such, the encrypted messages include the values satisfying $u=r^2$, $v=s^l$ and a, d, r, $s, \epsilon_R Z^*_N$ of the security module 330. The N, T, l among the public key parameters of the service providing server 350 are described above with reference to FIG. 3 and, therefore, a detailed description is omitted here.

The g parameter of g, f parameters indicate generator of a subgroup $G \epsilon Z^*_N$, and the f parameter indicates $g^{ab}$, $ID_V$. As such, when the encrypted message $Enc(PuKey_V, (u, v, g^a, d))$ is transmitted to the service providing server 350 (operation S500), the service providing server 350 decrypts the message encrypted by the secret key corresponding to the third public key of the service providing server 350 in operation S510.

After the encrypted message is decrypted (operation S510), the service providing server 350 creates predetermined constants b and c. Then, in operation S520, as a response to the received encryption message $Enc(PuKey_V,(u, v, g^a, d))$, the service providing server 350 transmits the message $Sig_V(g^b, c, d)$ signed with an electronic signature using the secret key of the service providing server 350 to the security module 330. The optional numbers b, c created by the service providing server 350 are elements included in $Z^*_N$.

When the message $Sig_V(g^b, c, d)$ is transmitted (operation S520), the security module 330 determines the validity of the service providing server 350 by determining whether the third authentication constants d included in the encrypted message $Enc(PuKey_V, (u, v, g^a, d))$ of the security module 330 and the electronic signature message $Sig_V(g^b, c, d)$ transmitted from the service providing server 350 are consistent in operation S530.

Here, when the third authentication constants d are consistent with each other (operation S530), the service providing server 350 is authenticated. Otherwise, the authentication fails, and, therefore, the currently operating security protocol ends.

If the service providing server 350 is authenticated based on the third authentication constant value d (operation S530), the security module 330 and the service providing server 350 create the session key $K_{session}$ in operation S540. This session key $K_{session}$ is created into $K_{session}=f(g^{ab}, ID_V)$ based on $g^{ab}$ (mod N) of $g^a$ and $g^b$ included in the encrypted message transmitted from the security module 330, and $ID_V$ of the service providing server 350. As such, the created session keys are used as a seed value of the secret key created to protect the channels in the security protocol.

When the session key is created after the authentication of the service providing server 350 (operation S540), the measurement metric M is created in the security operating system 320 of the user device 300 in S550.

When M is created (operation S550), y, z, M, $H(K_{session}, (u, v, y, z, M))$ are transmitted to the service providing server 350 in operation S560, wherein y and z are the first and the second zero-knowledge parameters for demonstrating the validity of the security module 330. Each parameter indicates $y=\beta_i r^l$ and $z=r^c$ s, based on the "Anonymous Authentication" scheme created by Dan Boneh and Matt Franklin. In operation S570, the parameters anonymously implement the authentication with respect to the user device 300, including the security module 330.

When the anonymous authentication is implemented based on the first and the second zero-knowledge parameters y and z (operation S570), the authentication completion is determined in operation S580. Here, if the authentication is not completed (operation S580), every process ends. Meanwhile, if the authentication with respect to the user device 300 is completed (operation S580), the service providing server 350 implements the integrity attestation in operation S590 by determining the consistency of the values generated by the service providing server 350 using M and the hash value (H) transmitted from the security module 330.

Here, if the compared has value (H) is consistent (operation S590), the integrity of the user device 300 is authenticated, thereby completing of the integrity attestation in operation S600. That is, although the service providing server 350 does not collect the original information on the user device 300 remotely, the authentication of the user device and the service providing server 350 is implemented anonymously and, accordingly, services provided by the service providing server 350 can be used by authenticating the integrity.

As described above, the system and method for providing security according to aspects of the present invention produce one or more of the following effects. First, the user device can receive an anonymous integrity attestation, and a remote service providing server can be authenticated. Moreover, when the remote integrity attestation is performed for the user device, the service providing server does not request user information from the user device, thereby guaranteeing anonymity. Furthermore, a session key for protection of the channel or a seed value for the session key can be safely shared without requiring separate protocols.

Various components of the apparatus as shown in FIG. 3 can be integrated into a single control unit, or alternatively, can be implemented in software or hardware, such as, for example, an application specific integrated circuit (ASIC). As such, it is intended that the processes described herein be broadly interpreted as being equivalently performed by software, hardware, or a combination thereof. Software modules can be written via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the security operating system 320 and the security module of the apparatus illustrated in FIG. 3 may be implemented as one unit. Accordingly, it is intended, therefore, that aspects of the present invention not be limited to the various example embodiments disclosed, but that the present invention includes all embodiments falling within the scope of the appended claims.

What is claimed is:

1. A system for providing security between a service providing server and a user device comprising a software and/or a hardware component to implement a service provided by the service providing server, the system comprising:
    a user device to request a service from the service providing server, to transmit a packet including a first public key to an authentication server, and to authenticate the service providing server based on a digital certificate signed by a second secret key corresponding to a second public key of the service providing server;
    the authentication server to receive the packet from the user device, to authenticate the user device based on the first public key, to generate a secret key if the user device is authenticated, and to transmit the generated secret key and the digital certificate to the user device; and
    the service providing server to check an integrity of the user device by using information for an integrity attestation comprising the generated secret key, which information is transmitted by the user device, and to provide the service to the user device according to the integrity of the user device.

2. The system as claimed in claim 1, wherein the packet transmitted by the user device and received by the authentication server further includes an identification (ID) of the service providing server.

3. The system as claimed in claim 2, wherein the user device comprises:
    a security module to store the certificate signed by the second secret key corresponding to the second public key of the service providing server.

4. The system as claimed in claim 3, wherein:
    the information for the integrity attestation comprises a first zero-knowledge parameter y defined as $\beta_{ir}^l$, a second zero-knowledge parameter z defined as $r^c$ s, a measurement metric M, and a hash value defined as H ($K_{session}$, (u, v, y, z, M)); and
    $\beta_i$ is the secret key generated by the authentication server, r is a first authentication constant, s is a second authentication constant, l is a constant set by the authentication server, $K_{session}$ is a session key between the security module and the service providing server, u is a first message created by the security module for authenticating the service providing server, and v is a second message created by the security module for authenticating the service providing server.

5. The system as claimed in claim 3, wherein the security module:
    generates a first message for authenticating the service providing server, a second message for authenticating the service providing server, and an encryption message for authenticating the service providing server produced by encrypting an authentication constant with a secret key corresponding to a third public key of the service providing server; and
    transmits the first message, the second message, and the encryption message to the service providing server in order to authenticate the service providing server.

6. The system as claimed in claim 5, wherein, in order for the security module to authenticate the service providing server, the service providing server decrypts the encryption message, and transmits to the security module a response message, including the third authentication constant, signed with an electronic signature using a secret key corresponding to the third public key of the service providing server.

7. The system as claimed in claim 1, wherein the secret key comprises secret key parameters created by the authentication server.

8. The system as claimed in claim 1, where the service providing server anonymously checks the integrity of the user device without requesting user information from the user device.

9. The system as claimed in claim 1, where if the user device determines the service providing server to be authentic, then a session key $K_{session}$ is created using an identification of the service providing server.

10. A method of providing security between a service providing server and a user device having a software and/or a hardware component to implement a service provided by the service providing server, the method comprising:
    requesting, by the user device, a service from the service providing server;
    transmitting, by the user device, a packet including a first public key to an authentication server;
    authenticating, by the authentication server, the user device based on the first public key, generating a secret key if the user device is authenticated, and transmitting the secret key and a digital certificate signed by a second secret key corresponding to a second public key of the service providing server to the user device;
    authenticating, by the user device, the service providing server based on the digital certificate;
    transmitting, by the user device, the secret key to the service providing server;
    checking, by the service providing server, an integrity of the user device by using information for an integrity attestation comprising the secret key; and
    providing, by the service providing server, the service to the user device according to the integrity of the user device.

11. The method as claimed in claim 10, wherein the packet transmitted from the user device to the authentication server further includes an identification (ID) of the service providing server.

12. The method as claimed in claim 10, wherein the user device comprises a security module to store the certificate signed by the second secret key corresponding to the second public key of the service providing server.

13. The method as claimed in claim 12, wherein:
    the information for the integrity attestation comprises a first zero-knowledge parameter y defined as $\beta_{ir}^l$, a second zero-knowledge parameter z defined as $r^c$ s, a measurement metric M, and a hash value defined as H ($K_{session}$, (u, v, y, z, M)); and $\beta_i$ is the secret key generated by the authentication server, r is a first authentication constant, s is a second authentication constant, l is a constant set by the authentication server, $K_{session}$ is a session key between the security module and the service providing server, u is a first message created by the security module for authenticating the service providing server, and v is a second message created by the security module for authenticating the service providing server.

14. The method as claimed in claim 10, wherein the secret key comprises secret key parameters created by the authentication server.

15. The method as claimed in claim 10, where the service providing server anonymously checks the integrity of the user device without requesting user information from the user device.

16. The method as claimed in claim 10, where if the user device determines the service providing server to be authentic, then a session key $K_{session}$ is created using an identification of the service providing server.

17. A user device to request a service in a system for providing security including a service providing server providing the service and an authentication server to authenticate the user device, the user device comprising:
    a security module to transmit a packet including a first public key to the authentication server in order to authenticate the user device based on the first public key, to receive a secret key and a digital certificate signed by a second secret key corresponding to a second public key of the service providing server from the authentication server if the user device is authenticated, to authenticate the service providing server based on the digital certificate, and to transmit information, for an integrity attestation, comprising the received secret key to the service providing server; and
    an authenticated target to request a service from the service providing server, and to use the service if the authenticated target is verified by the service providing server for the integrity attestation.

18. A service providing server to anonymously provide a service to an authenticated user device that receives a secret key in a system for providing security, wherein the service providing server is configured to:
    check an integrity of the user device without requesting user information from the user device, by using information for an integrity attestation having the secret key, which is received from the user device; and
    provide the service to the user device according to the integrity of the user device,
    wherein the user device is authenticated by an authentication server based on a public key which is transmitted from the user device.

19. A system for providing security between a service providing server and a user device configured to implement a service provided by the service providing server, the system comprising:
    a user device to request a service from the service providing server, to transmit a packet comprising authenticating contents to an authentication server, and to authenticate the service providing server based on contents of a response from the authenticating server;
    the authentication server to receive the packet from the user device, to authenticate the user device based on the authenticating contents of the packet, to generate a secret key if the user device is authenticated, and to transmit the generated secret key and a response comprising contents authenticating the service providing server to the user device; and
    the service providing server to anonymously check an integrity of the user device by using information for an integrity attestation comprising the generated secret key, which information is transmitted to the service providing server by the user device, and to provide the service to the user device according to the integrity of the user device.

20. A method of providing security between a service providing server and a user device comprising a component to implement a service provided by the service providing server, the method comprising:
    requesting, by the user device, a service from the service providing server;
    transmitting, by the user device, a packet including authenticating contents to an authentication server;
    authenticating, by the authentication server, the user device based on the authenticating contents of the packet, generating a secret key if the user device is authenticated, and transmitting the generated secret key and a response comprising contents authenticating the service providing server to the user device;
    authenticating, by the user device, the service providing server based on the contents of the response from the authenticating server;
    transmitting, by the user device, the secret key to the service providing server;
    anonymously checking, by the service providing server, an integrity of the user device by using information for an integrity attestation comprising the secret key; and
    providing, by the service providing server, the service to the user device according to the integrity of the user device.

* * * * *